United States Patent
Habenschaden

(10) Patent No.: US 8,395,379 B2
(45) Date of Patent: Mar. 12, 2013

(54) INDUCTIVE SENSOR FOR SPEED, ROTATIONAL DIRECTION AND POSITION MEASUREMENTS IN THE HIGH TEMPERATURE RANGE

(75) Inventor: Josef Habenschaden, Kohlberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 243 days.

(21) Appl. No.: 12/988,206

(22) PCT Filed: Apr. 7, 2009

(86) PCT No.: PCT/EP2009/002540
§ 371 (c)(1),
(2), (4) Date: Oct. 15, 2010

(87) PCT Pub. No.: WO2009/132754
PCT Pub. Date: Nov. 5, 2009

(65) Prior Publication Data
US 2011/0031963 A1 Feb. 10, 2011

(30) Foreign Application Priority Data
Apr. 29, 2008 (DE) .......... 10 2008 021 327

(51) Int. Cl.
*G01N 27/72* (2006.01)
*H01F 27/30* (2006.01)
(52) U.S. Cl. ........................... 324/239; 336/208
(58) Field of Classification Search ............ 324/207.15, 324/239; 336/208
See application file for complete search history.

(56) References Cited

U.S. PATENT DOCUMENTS

| | | | |
|---|---|---|---|
| 5,606,254 A | 2/1997 | Xie et al. | |
| 5,942,893 A * | 8/1999 | Terpay | ............... 324/207.18 |
| 6,223,419 B1 * | 5/2001 | Abramov | ................. 29/602.1 |
| 6,969,987 B2 | 11/2005 | Schwartzbart | |
| 7,161,348 B2 | 1/2007 | Luber et al. | |

FOREIGN PATENT DOCUMENTS

| DE | 28 48 173 C3 | 6/1980 |
|---|---|---|
| DE | 33 26 477 A1 | 1/1985 |
| DE | 33 26 476 A1 | 2/1985 |
| DE | 199 19 031 C2 | 5/2001 |
| DE | 20 2004 019 489 U1 | 6/2005 |
| FR | 2 800 459 A1 | 5/2001 |
| WO | 97/39312 A1 | 10/1997 |
| WO | 2007/137693 A2 | 12/2007 |

OTHER PUBLICATIONS

Dragan Dinulovic, Student Member, IEEE and Hans H. Gatzen, Member, IEEE, "Microfabricated Inductive Micropositioning SEnsor for Measurement of a Linear Movement", IEEE Sensors Journal, vol. 6, No. 6, S 1482-1487, Dec. 2006.

* cited by examiner

*Primary Examiner* — Bot Ledynh
(74) *Attorney, Agent, or Firm* — Davis & Bujold, PLLC

(57) ABSTRACT

An inductive sensor with coils arranged substantially in layers on a flat circuit-carrier. The edges of the flat circuit-carrier are metallized obliquely so that an upper side, a lower side, an intermediate layer and/or a plurality of intermediate layers of the flat circuit-carrier are interconnected with one another via the edges in a conductive manner.

9 Claims, 3 Drawing Sheets

HOT ZONE

COOLER ZONE SEPARATED BY GEARBOX OR MOTOR HOUSING

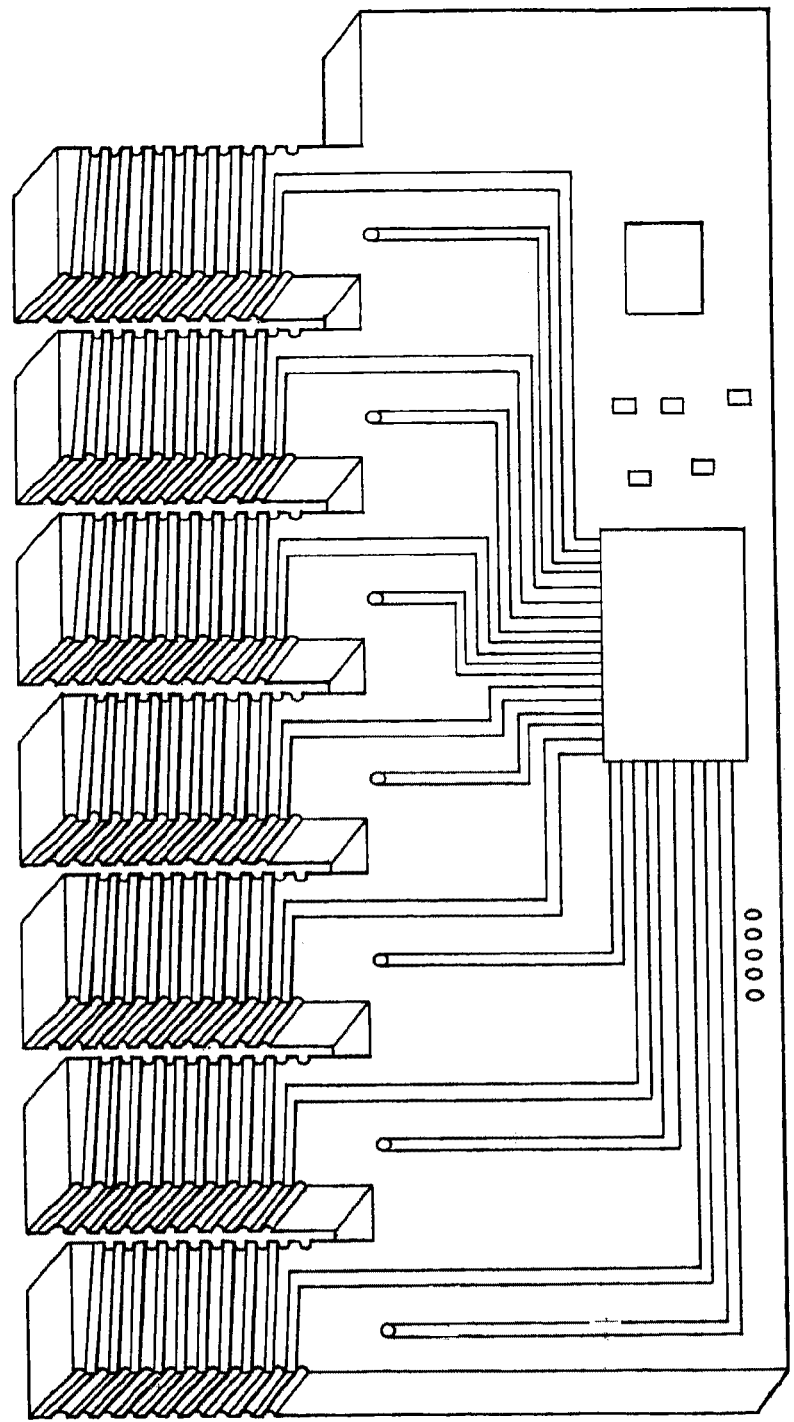

INDUCTIVE SENSOR FOR SPEED, ROTATIONAL DIRECTION AND POSITION MEASUREMENTS IN THE HIGH TEMPERATURE RANGE

This application is a National Stage completion of PCT/EP2009/002540 filed Apr. 7, 2009, which claims priority from German patent application serial no. 10 2008 021 327.6 filed Apr. 29, 2008.

FIELD OF THE INVENTION

The invention relates to an inductive sensor.

BACKGROUND OF THE INVENTION

A current technical debate concerns means for reducing the fuel consumption of motor vehicles. This technical debate is part of the wider economic and ecological debate about reducing the associated carbon-dioxide emissions. Suppliers in the various sectors of automotive technology, too, consequently feel challenged to call existing technical concepts into question.

One approach by automobile manufacturers to addressing the problem of carbon-dioxide emissions consists in reducing ('downsizing') the stroke volume of engines while preserving or even increasing their power. This approach has virtually reached the technological limits of current mechanical solutions. To obtain the best possible results within these limits of engine technology, sensors are used for monitoring and control purposes even in situations where they were not used previously, for example in surroundings with operating temperatures in excess of 150° C.

The electronic components currently used have operating temperature limits of around 150° C. and, in the new applications, come very close to those limits. A possible remedy to this is to adopt measures for cooling and protecting the sensors, but such measures are elaborate and costly.

Even coils used for inductive sensors are approaching the limits of their operating temperatures, since for geometrical reasons such sensor arrays and their electronic components have to be positioned very close to the moving signal-emitters in order to be able, reliably, to transmit not only large signal variations but small ones as well.

To improve the sensitivity or signal range of an inductive sensor, those with knowledge of the subject can increase the number of turns in the coil. In the prior art multilayer circuit-carriers are known, which can be used to multiply the number of turns of an initially monolayer sensor. For example, in a four-layer circuit-carrier the number of turns is multiplied fourfold and in a six-layer circuit-carrier the number of turns is multiplied sixfold. FIG. 1 illustrates the operating principle of a known coil of this type with a plurality of windings; FIG. 1 also shows the distribution of the magnetic field produced by this coil. Thus, the windings extend over several layer planes.

Against this background the invention starts from circuit-carriers or printed circuit boards as known, for example, from DE 20 2004 019 489 U1. Both the upper side and the lower side of this circuit-carrier or this inductive sensor unit carry coils, i.e. a plurality of coils are accommodated in more than one layer of the printed circuit. In the prior art two, three or four layers of this flat type are known.

SUMMARY OF THE INVENTION

The objective set by the present invention is to increase the signal range of a signal voltage of the inductive sensor, again with the help of the number of turns.

This objective is achieved in that the edges of the flat circuit-carrier are metallized obliquely ("obliquely" means, in particular, so as to connect the upper side and the lower side of the flat circuit-carrier to one another). By virtue of this measure an upper layer and a lower layer of the circuit-carrier (or intermediate layers as well) can be connected to form a coil consisting of tracks that run obliquely over the edges of the circuit-carrier.

BRIEF DESCRIPTION OF THE DRAWINGS

The invention can be explained more precisely with reference to the attached drawings which show in:

FIG. 3 is another embodiment of an inductive sensor according to the invention.

DETAILED DESCRIPTION OF THE PREFERRED EMBODIMENTS

Figure 1:
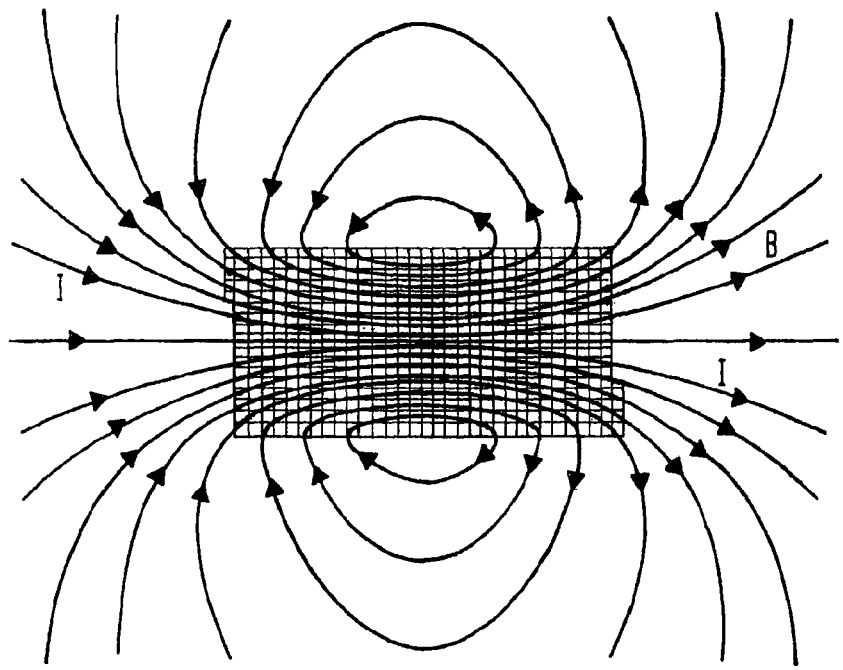
FIG. 1 is an illustration of the law of induction.

By the law of induction, in accordance with which the terminal voltage U is proportional to the number of turns N, increasing the number of turns produces a higher induced voltage in a coil, which follows the principle of FIG. 1.

Figure 2:
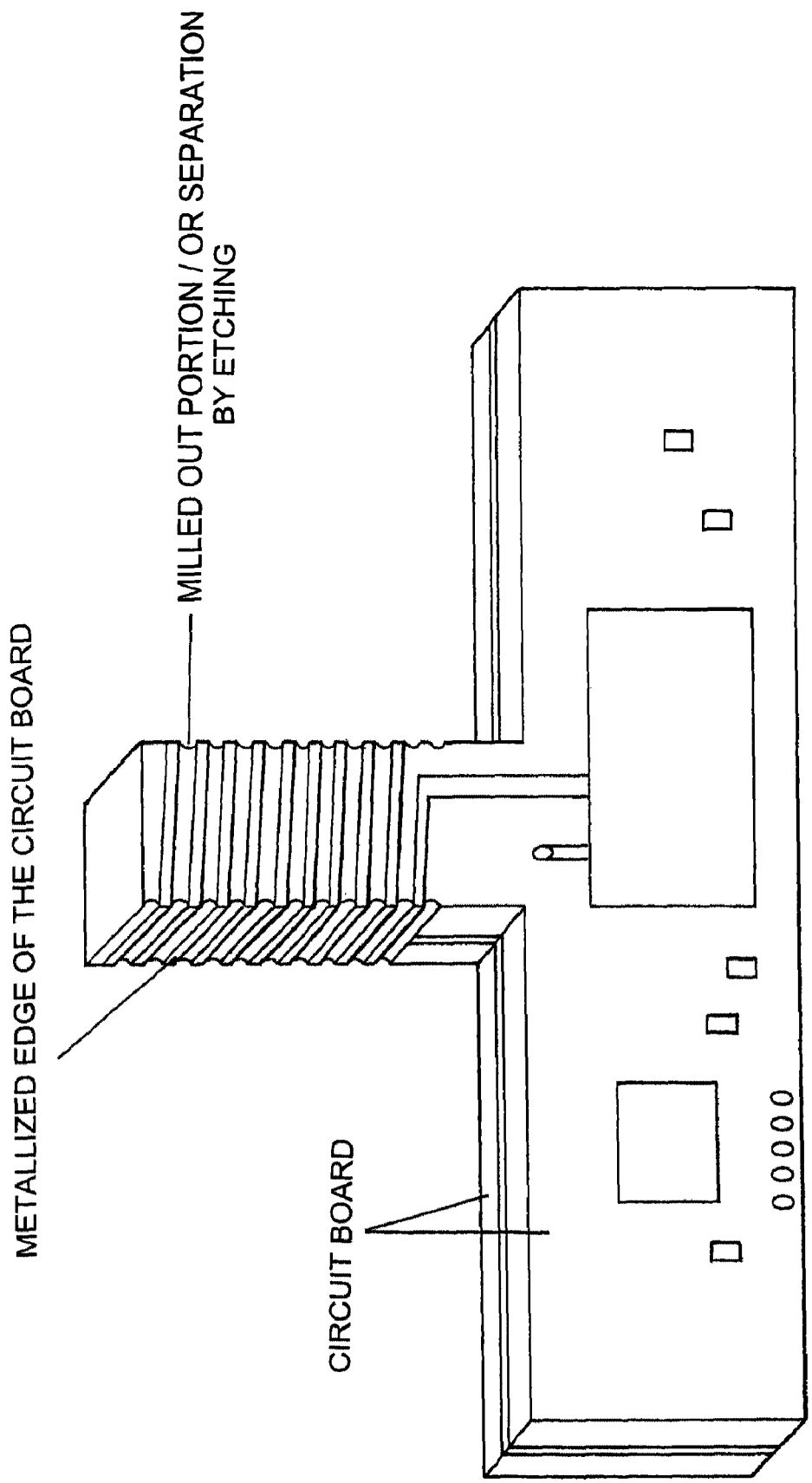
FIG. 2 is an embodiment of an inductive sensor according to the invention.

For the technological creation of an electromagnetically effective coil of such type, the metallized edges of the circuit-carrier are cut into by milling or by etching obliquely or by laser cutting, etc., and in this way the conductive metallizing material is interrupted in a designed manner. If this machining step is repeated several times, then as shown in FIG. 2 this results in a spiral coil whose helical path runs over all the sides (for example all four sides) of the circuit-carrier. As shown in FIG. 2, the coil can be made as a four-sided probe with a relatively long and thin shape. This coil, which for example could also be three-sided, is mounted as it were on an ordinary printed circuit board. The attached side of the probe (i.e. not its free end) broadens out—in other words increasing its area toward the back—in order to allow the necessary electronic components to be fitted conventionally on it. Compared with a usual, planar coil lying in the plane of the printed circuit, by virtue of the technique according to the invention the active cross-sectional area of the coil is rotated by 90 degrees on its edge.

The advantage of this design according to FIG. 2 is that the electronic components are spatially distanced from the operating area in which the probe is taking measurements (i.e. in which any variation of the magnetic field is being measured, for example in an unfavorable environment).

In FIG. 3 this principle is extended by a comb-like combination of individual probes of this type. This comb forms a coil array which can be designed as a linear or path-measuring system. Here too, the measurement plane (the plane containing the tips of the probes forming the comb) is far removed from the electronic components located farther to the rear. The damping element can be moved past at a given distance either above the coil system or to one side of it, the latter also having an influence.

Figure 4:
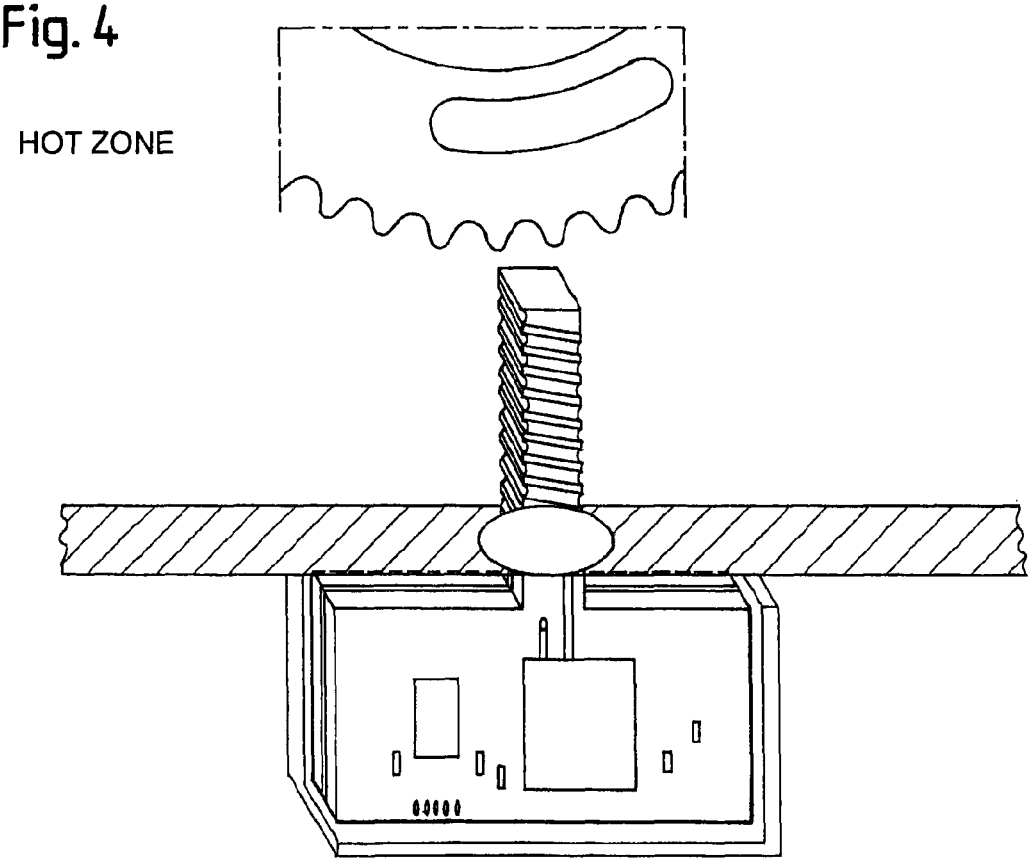
FIG. 4 is the inductive sensor according to FIG. 2 arranged to project out of a housing into a hot measurement zone.

FIG. 4 shows an application of the principle according to the invention in a further example embodiment of a probe-type sensor, which projects out of a protective housing into the hot measurement zone and there detects the passage of teeth of a pulse-generating gearwheel as they rotate past it.

With the arrangement shown in FIG. 4, in particular the rotational speed of the pulse-generating wheel can be detected. For this, the actuating impulse tooth can for example be permanently magnetized. However, the impulse tooth can also be a magnetically soft material in order to vary a magnetic field produced as in FIG. 1 and measure the reactive effect of the changed magnetic field on the current producing the field. A particularly preferred mechanism is based on non-magnetic but electrically conductive impulse teeth, which bring about an eddy-current damping of a magnetic field as produced according to FIG. 1.

In the rotational speed detection device according to FIG. 4 the circuit-carrier with its electronic components is in a cooler zone separated by a wall from the hot zone of the transmission or the engine. The probe projects through a hole in the wall of the transmission or engine into the hot zone, in which the impulse wheel is rotating.

If in addition to the rotational speed, the rotation direction also has to be determined, there are two possibilities with the arrangement according to FIG. 4. Either the teeth of the impulse wheel can be coded in such manner that by virtue of their magnetic or non-magnetic 'labeling' they can be distinguished individually. In that case, as illustrated, a single probe suffices to recognize the rotational direction from the sequence of their signals. Alternatively, the impulse wheel can be completely uncoded and a further probe can be arranged on the circuit-carrier close to the individual probe shown, offset in the rotational direction of the outer circumference of the impulse wheel. If the lateral separation of these two probes in the movement direction does not correspond to the periodicity of the impulse teeth, it can be detected at which of the two probes the pulse from a tooth arrives first.

The invention claimed is:

1. An inductive sensor with coils arranged in layers on a flat circuit-carrier,
   wherein the flat circuit-carrier has a body and a probe extending therefrom, the probe being formed by a top surface and lateral faces onto which a conductive material is applied by metallization,
   the conductive material is interrupted along a helical path, on the lateral faces, so that a coil is formed whose helical path runs over all the lateral faces of the probe, and
   the body of the circuit-carrier being supported on one side of a housing wall such that the probe passes through the housing wall and the top surface of the probe is located on an opposite side of the housing wall.

2. The inductive sensor according to claim 1, wherein the interruptions on the lateral faces are produced by one of milling, obliquely etching and laser incision into the lateral faces.

3. The inductive sensor according to claim 1, wherein the lateral faces are one of milled, obliquely etched and laser-cut several times.

4. The inductive sensor according to claim 1, wherein the probe has either three or four lateral faces.

5. The inductive sensor according to claim 1, wherein the probe broadens out on its lateral faces, in a direction opposite to the top surface, in order to allow desired electronic components to be fitted thereon.

6. The inductive sensor according to claim 1, wherein the lateral faces are designed such that the probe has a long and thin shape.

7. The inductive sensor according to claim 1, wherein a plurality of probes are arranged adjacent one another in the manner of a comb.

8. An inductive sensor comprising:
   a flat circuit carrier with a plurality of probes being aligned along an edge of the circuit carrier,
   each probe comprises three or four metallized lateral faces and a top face,
   each of the three or four metallized faces comprising channels which are cut therein to form a helical coil that spans a length of all the lateral faces, and
   the circuit-carrier being supported on one side of a housing wall such that the pluralit of probes pass through the housing wall and the top faces of the plurality of probes are located on an opposite side of the housing wall.

9. The inductive sensor according to claim 1, wherein the body supports electronic components and the housing wall comprises a hole, the body of the circuit-carrier is supported on the housing wall such that the probe passes through the hole in the housing wall and such that the electronic components are located on a first side of the housing wall and the top surface of the probe is located on the opposite side of the housing wall.

\* \* \* \* \*